(12) United States Patent
Herrera

(10) Patent No.: US 8,474,879 B2
(45) Date of Patent: Jul. 2, 2013

(54) NON THREADED DRILL PIPE CONNECTION

(76) Inventor: Derek F. Herrera, Aberdeenshire (GB)

( * ) Notice: Subject to any disclaimer, the term of this patent is extended or adjusted under 35 U.S.C. 154(b) by 0 days.

(21) Appl. No.: 13/197,217

(22) Filed: Aug. 3, 2011

(65) Prior Publication Data

US 2012/0049513 A1    Mar. 1, 2012

(30) Foreign Application Priority Data

Sep. 1, 2010 (GB) .................................... 1014511.8

(51) Int. Cl.
*F16L 39/00* (2006.01)

(52) U.S. Cl.
USPC ........... 285/321; 285/330; 285/331; 285/913; 285/917

(58) Field of Classification Search
USPC .................. 285/27, 321, 330, 331, 403, 913, 285/922, 917; 175/320
See application file for complete search history.

(56) References Cited

U.S. PATENT DOCUMENTS

| 738,503 | A | * | 9/1903 | Waters | 285/321 |
|---|---|---|---|---|---|
| 2,084,431 | A | * | 6/1937 | Catley | 285/314 |
| 2,238,706 | A | | 4/1941 | Ohls | |
| 3,345,084 | A | | 10/1967 | Hanes et al. | |
| 3,345,085 | A | | 10/1967 | Hanes et al. | |
| 3,381,983 | A | | 5/1968 | Hanes | |
| 3,521,911 | A | | 7/1970 | Hanes et al. | |
| 3,816,774 | A | * | 6/1974 | Ohnuki et al. | 310/332 |
| 3,989,964 | A | * | 11/1976 | Gikow et al. | 310/317 |
| 4,138,148 | A | | 2/1979 | Zaremba | |
| 4,277,875 | A | | 7/1981 | Worrell | |
| 4,611,662 | A | | 9/1986 | Harrington | |
| 4,830,408 | A | * | 5/1989 | Reimert | 285/27 |
| 5,026,200 | A | * | 6/1991 | van Bilderbeek | 403/322.1 |
| 5,086,843 | A | | 2/1992 | Mims et al. | |
| 5,839,524 | A | | 11/1998 | Sanford | |
| 2002/0163190 | A1 | | 11/2002 | Munk et al. | |
| 2005/0073218 | A1 | * | 4/2005 | Topliss et al. | 310/328 |
| 2008/0111377 | A1 | * | 5/2008 | Nauer | 285/403 |
| 2011/0147009 | A1 | | 6/2011 | Dupal et al. | |

FOREIGN PATENT DOCUMENTS

| AU | 485139 | B2 | 12/1975 |
|---|---|---|---|
| DE | 10163981 | A1 | 2/2003 |
| EP | 0405951 | A1 | 6/1990 |
| EP | 0405951 | A1 | 1/1991 |
| GB | 1487948 | A | 10/1977 |
| GB | 2099945 | A | 12/1982 |
| GB | 2156467 | A | 3/1984 |

(Continued)

OTHER PUBLICATIONS

International Search Report—International Application PCT/GB2011/051557, Feb. 27, 2012.

(Continued)

*Primary Examiner* — James Hewitt
*Assistant Examiner* — Jay R Ripley
(74) *Attorney, Agent, or Firm* — Richard A. Fagin

(57) ABSTRACT

A threadless connection for coupling segments of pipe longitudinally end to end includes a pin end having a groove for receiving therein a locking ring. A box end has a groove for receiving the locking ring therein when the pin end is inserted into the box end. The locking ring has an uncompressed diameter selected to exert lateral force on the groove in the box end when assembled to the pin end.

12 Claims, 16 Drawing Sheets

FOREIGN PATENT DOCUMENTS

| | | | |
|---|---|---|---|
| GB | 2156467 | A | 10/1985 |
| GB | 2165606 | A | 4/1986 |
| GB | 2357379 | A | 11/2002 |
| GB | 2375379 | A | 11/2002 |
| WO | 2007000023 | A1 | 1/2007 |

OTHER PUBLICATIONS

GB Patent Application No. GB1014511.8 Search Report, Sep. 23, 2010.

Search Report, GB patent application No. 1014511.8, Sep. 23, 2010.

* cited by examiner

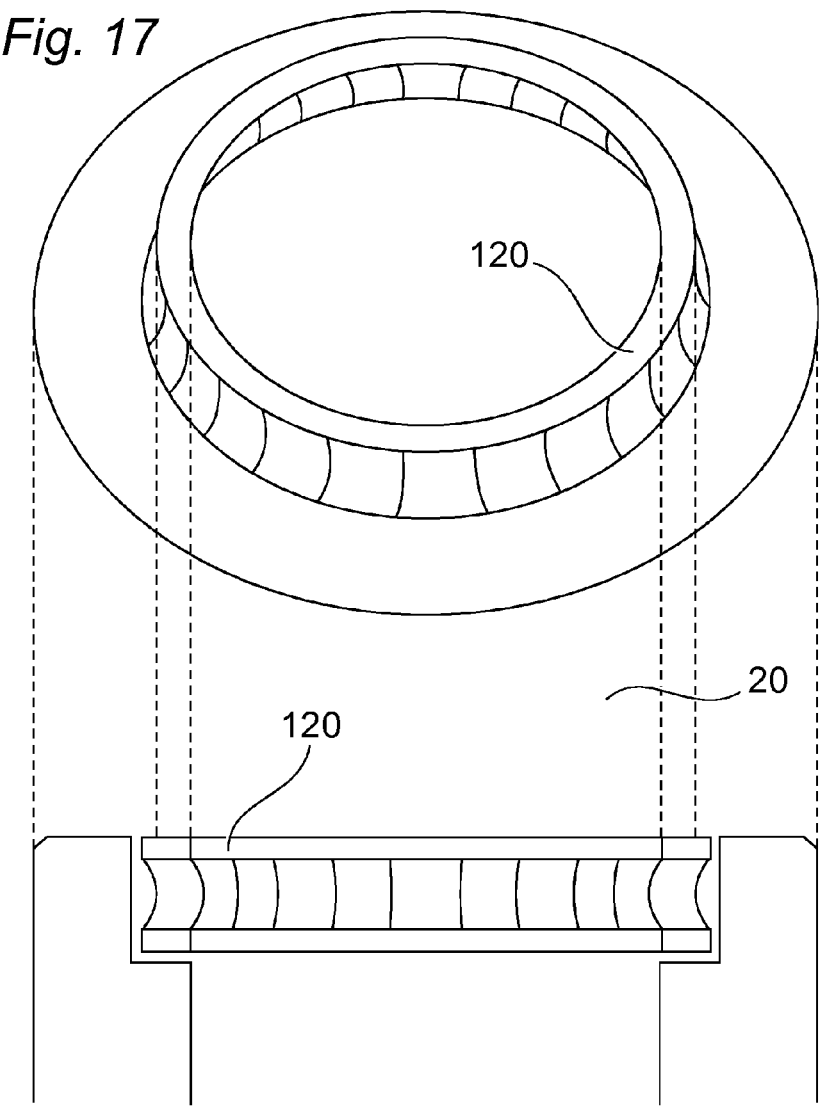

NON THREADED DRILL PIPE CONNECTION

CROSS-REFERENCE TO RELATED APPLICATIONS

Priority is claimed from British Patent Application No. GB 1014511.8 filed on Sep. 1, 2010.

STATEMENT REGARDING FEDERALLY SPONSORED RESEARCH OR DEVELOPMENT

Not applicable.

BACKGROUND OF THE INVENTION

1. Field of the Invention

The invention relates generally to the field of drill pipe used in the drilling of wellbores through subsurface rock formations. More specifically, the invention relates to connectors for segments of such pipe that do not require threads.

2. Background Art

The exploration for and production of hydrocarbons from subsurface rock formations ultimately requires a method to reach and extract the hydrocarbons from the formations. The reaching and extracting are typically performed by drilling a wellbore from the Earth's surface to the hydrocarbon-bearing Earth formations using a drilling rig. In its simplest form, a drilling rig is used to support a drill bit mounted on the end of a drill string. The drill string is typically formed from lengths of drill pipe or similar tubular segments connected end to end. The drill string is supported by the drilling rig structure at the Earth's surface. A drilling fluid made up of a base fluid, typically water or oil, and various additives, is pumped down a central opening in the drill string. The fluid exits the drill string through openings called "jets" in the body of the rotating drill bit. The drilling fluid then circulates back up an annular space formed between the borehole wall and the drill string, carrying the cuttings from the drill bit so as to clean the borehole. The drilling fluid is also formulated such that the hydrostatic pressure applied by the drilling fluid is greater than surrounding formation fluid pressure, thereby preventing formation fluids from entering into the borehole.

The fact that the drilling fluid hydrostatic pressure typically exceeds the formation fluid pressure also results in the fluid entering into the formation pores, or "invading" the formation. To reduce the amount of drilling fluid lost through such invasion, some of the additives in the drilling fluid adhere to the borehole wall at permeable formations thus forming a relatively impermeable "mud cake" on the formation walls. This mud cake substantially stops continued invasion, which helps to preserve and protect the formation prior to the setting of protective pipe or casing in the borehole as part of the drilling process, as will be discussed further below. The formulation of the drilling fluid to exert hydrostatic pressure in excess of formation pressure is commonly referred to as "overbalanced drilling."

The drilling fluid ultimately returns to the surface, where it is transferred into a mud treating system, generally including components such as a shaker table to remove solids from the drilling fluid, a degasser to remove dissolved gases from the drilling fluid, a storage tank or "mud pit" and a manual or automatic means for addition of various chemicals or additives to the fluid treated by the foregoing components. The clean, treated drilling fluid flow is typically measured to determine fluid losses to the formation as a result of the previously described fluid invasion. The returned solids and fluid (prior to treatment) may be studied to determine various rock formation characteristics used in drilling operations. Once the fluid has been treated in the mud pit, it is then pumped out of the mud pit and is pumped into the top of the drill string again.

As the wellbore is made progressively deeper, additional lengths ("joints") of pipe are added to the drill string. The most common technique for adding such addition joints is to threadedly couple them end to end. The threads transmit axial and torque loading between pipe joints and form a seal to prevent loss of fluid (mud) under pressure as it is pumped through the drill string.

A limitation to the use of threaded connections is that they must be connected so as to avoid cross threading. Threaded connections must be screwed together to a precise torque to prevent damage and to fully transmit rotational energy along the drill string. Threaded connections are also subject to being unscrewed (broken) in the event of "stick slip" motion of the drill string. See, e.g., U.S. Pat. No. 7,140,452 issued to Hutchinson. Further, it is impractical to rotate a drill string in a direction opposed to the threaded connection "make up" direction because of the risk of unscrewing one or more pipe connections.

Accordingly, there exists a need for a type of drill string pipe connection that does not require threads and can be rotated in either direction.

SUMMARY OF THE INVENTION

A threadless connection according to one aspect of the invention for coupling segments of pipe longitudinally end to end includes: a pin end having a groove for receiving therein a locking ring; a box end having a groove for receiving the locking ring therein when the pin end is inserted into the box end; wherein the locking ring has an uncompressed diameter selected to exert lateral force on the groove in one of the pin and box ends when assembled to the other of the pin and box ends.

According to a second aspect according to the present invention, there is provided a pin end adapted to forms one end of the threadless connection according to the first aspect of the invention.

According to a third aspect according to the present invention, there is provided a box end which forms one end of the threadless connection according to the first aspect of the invention.

Other aspects and advantages of the invention will be apparent from the following description and the appended claims.

BRIEF DESCRIPTION OF THE DRAWINGS

FIG. 17 shows example placement of the metal seal ring in the top of the box.

FIG. 18 shows a cross-section of the top of the box.

DETAILED DESCRIPTION

Mechanics of drilling a wellbore using a drill string assembled from segments ("joints") coupled longitudinally end to end are well described in the Hutchinson '452 patent referenced in the Background section herein. The following description is related to various examples of drill string joints that are coupled together longitudinally end to end without the use of threaded ends, such ends being referred to in the art as "tool joints", and when threaded, as "threaded connections."

Drill pipe and other connections (e.g., conductors, casing, tubing, line pipe such as water, etc.) as noted above are typically made up of threaded connections, and this has led to serious causes of accidents in the drilling industry, among other industries.

This present invention may do (3) three different things. The invention seeks to (1) diminish these accidents and at the same time (2) speed up the running and pulling out of the hole time (particularly for drill pipe), and the connection configuration (3) allows the assembled pipe to be turned to the right or to the left as is desired. The latter feature is particularly expected to help wellbore drilling. These features will save time and money wherever this connection is used.

As a general description, firstly, the pipe connection has no threads. Secondly, one pipe segment is pushed into another and held together by a metallic ring(s) or snap ring(s) and includes one or more seals holding fluid pressure internally and externally with respect to the pipe. The pipe connection may be disassembled apart by compressing or collapsing the metallic ring or snap rings. Examples of the foregoing include mechanical, magnetic or electrical means or by a combination of all or part of the foregoing. Thus, when, for example, the tool joint (connection) is in the rotary table, the slips have engaged and the weight on the connection is neutral, the metallic ring or snap ring is collapsed or compressed as the pin end enters the box, and may be released by applying one of the means described above.

Figure 1:
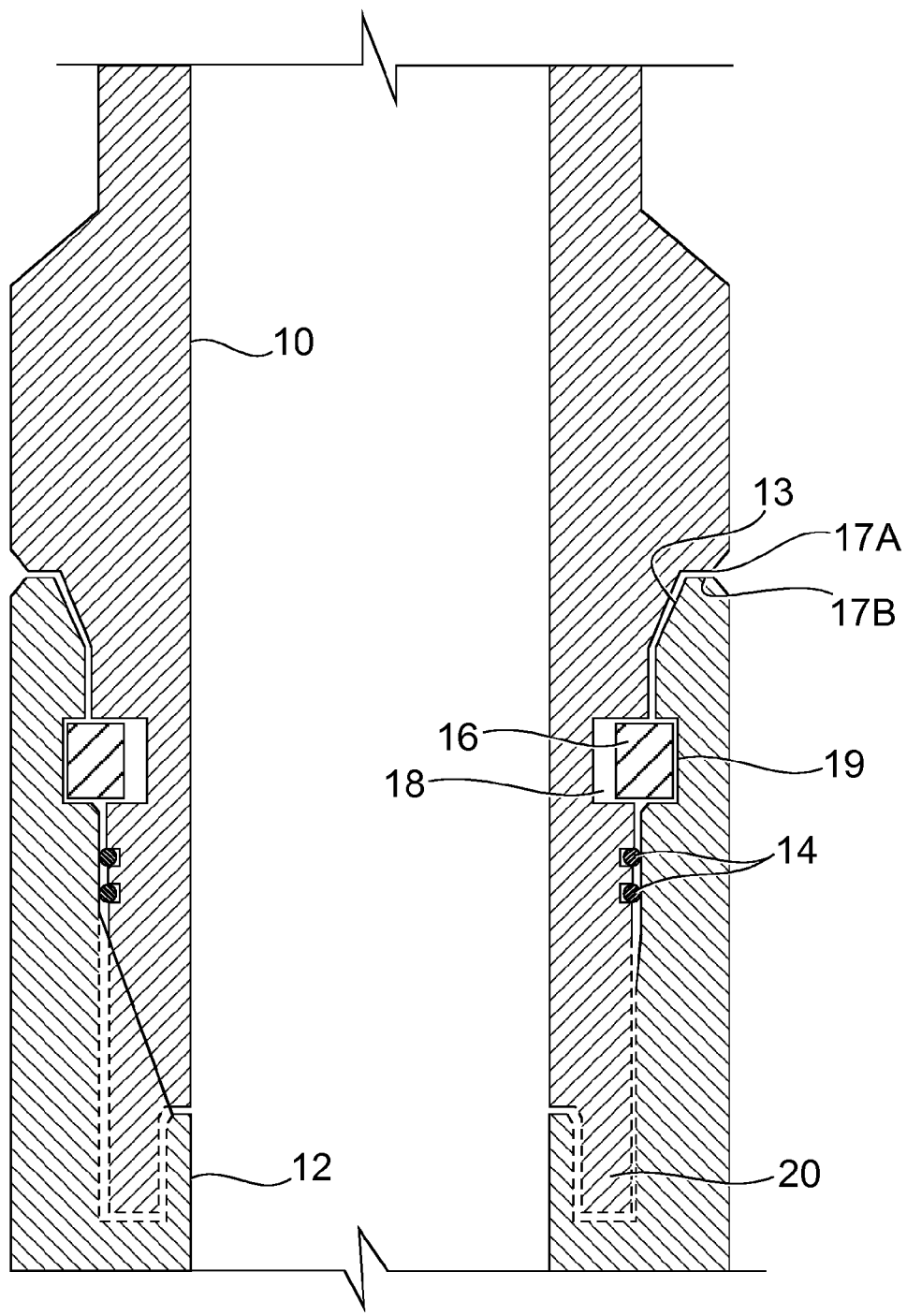
FIG. 1 is an example of one type of threadless drill string connection.

One example implementation of a threadless connection is shown in cross section in FIG. 1. A male tool joint, called a "pin" or "pin end" 10 on one end of a pipe joint is mated with a female tool joint, called a "box" or "box end" on the longitudinal end of the adjacent pipe joint. In the present example the pin end 10 may include a groove 18 for retaining a locking ring 16. The locking ring 16 may be generally "C" shaped and be disposed in the groove 18 for engagement with a corresponding groove 19 in the box end 20. The pin end 10 may include O-rings 14 or similar sealing elements in respective grooves on its outer surface to sealingly engage the outer surface of the box end 20 when the pin 10 and box 20 are assembled. Splines, profiles or other non-circularly shaped torque transmission elements 20 may be formed into the longitudinally endmost part of the pin end 10 to engage corresponding features in the box end 20. The torque transmission elements 20 are of sufficient number, are of selected shape and have size selected to enable communication of torque from the pin end 10 to the box end 20 in either rotational direction, and at torque values commonly associated with drilling operations (e.g., in the tens of thousands of foot-pounds). The locking ring 16 couples the pin end 10 to the box end 20 also to enable lifting the drill string out of a wellbore. During drilling operations, axial loading may be applied to the lower portions of the drill string by communication of the axial loading through adjacent shoulders 17A, 17B on the respective pin end 10 and box end 20. It will be appreciated by those skilled in the art that the requirements for communication of axial loading are substantially reduced when the drill string is lifted, as contrasted with drilling and/or reaming operations where a drill bit (not shown, see the Hutchinson patent referred to above) is axially urged against the bottom of a wellbore or a reaming tool is urged downwardly in the wellbore.

Figure 2:
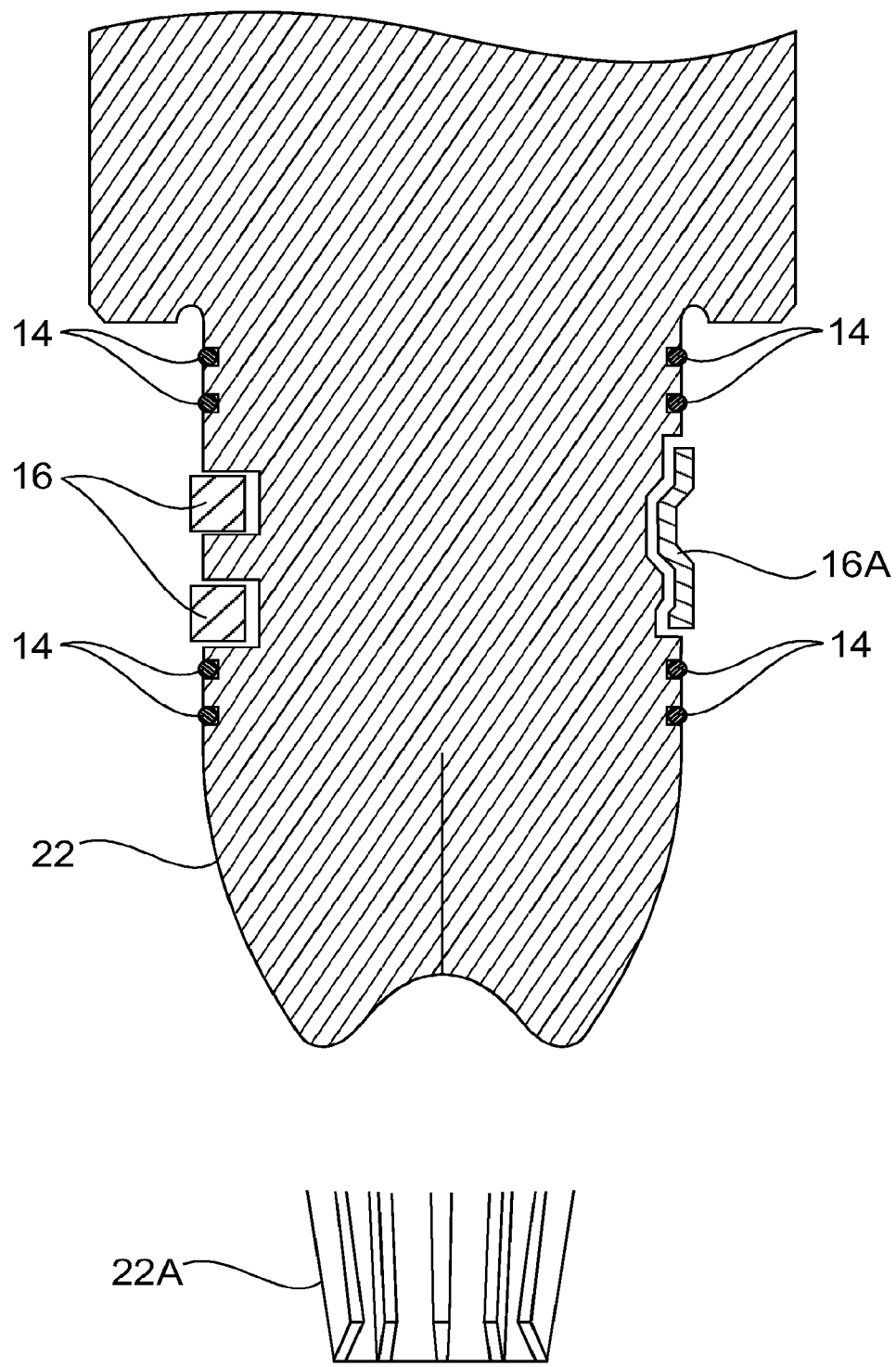
FIG. 2 illustrates splines used to transmit torque across a pipe joint connection.

Another example of the threadless coupling is shown in FIG. 2. To enhance the axial load carrying capacity of the connection, more than one locking ring 16 may be used in certain examples. The example shown in FIG. 2 includes two locking rings 16 as one example shown on the left hand side of the groove, to engage the pin end 10 to the box end 20. The example in FIG. 2 may include O-rings or similar sealing elements 14 on both longitudinal sides of the locking rings 16 to improve the capability of the threadless connection to withstand differential fluid pressure between the interior of the drill string, wherein fluid is pumped by mud pumps, and the wellbore annulus, which may be at substantially lower fluid pressure. Again, see the Hutchinson patent for further description of such fluid pumping and relative pressures. The example shown in FIG. 2 may include profiles or splines 22, 22A on the pin end and box end, respectively, to transmit torque across the threadless connection. A different example locking ring 19A with a profile shape is shown on the right hand side of FIG. 2. Other examples are shown in and will be explained with reference to FIGS. 7 and 10.

Figure 3:
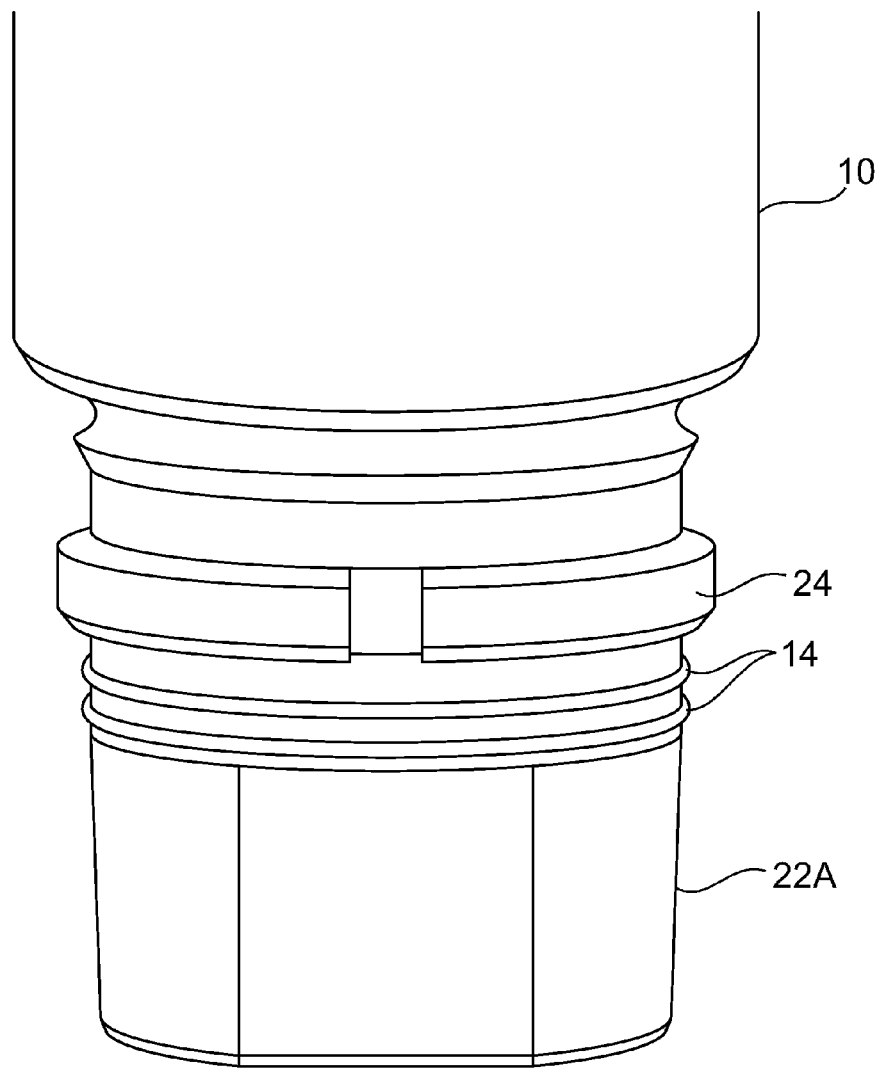
FIG. 3 shows an example of a locking ring that can hold a non-threaded connection together axially.
Figure 4:
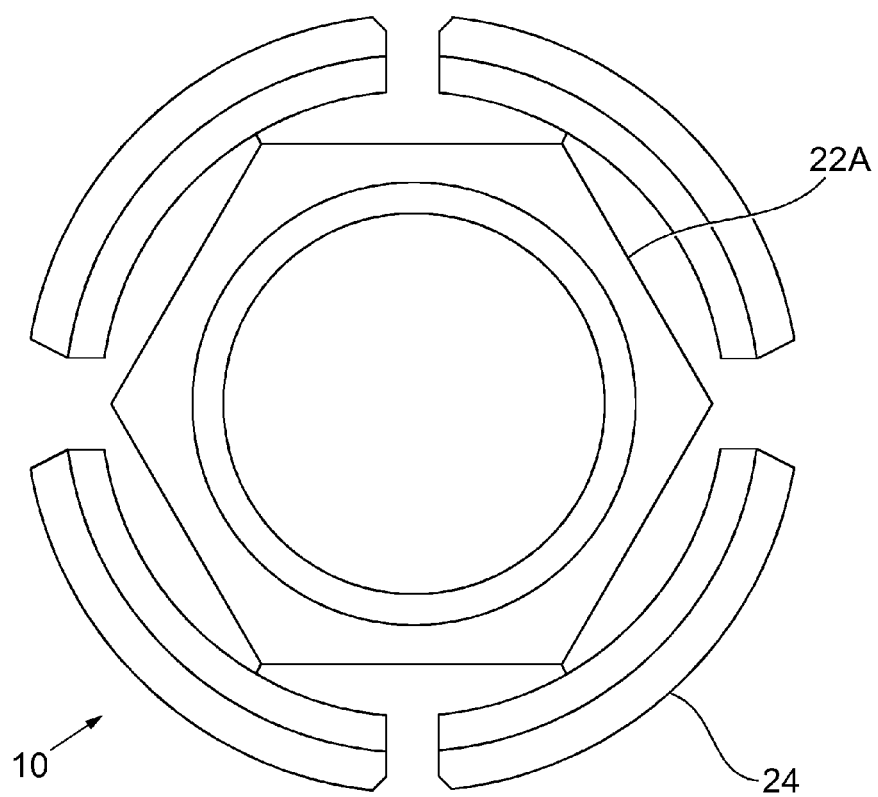
FIG. 4 shows a cross section of an example threadless connection.

An expanded view of the pin end is shown in FIG. 3 to illustrate the locking ring in more detail. The locking ring 24 may be made from spring steel or similar material configured so that when laterally unloaded traverses a diameter greater than the groove in the pin end (10 in FIG. 1). The ring 24 may be configured to have an unloaded diameter such that lateral pressure is exerted in the groove in the box end (12 in FIG. 1) when the ends are mated. The example shown in FIG. 3 may include a hexagonal profile to transmit torque to the box end when mated to the pin end. The example shown in FIG. 3 is shown in cross section in FIG. 4.

Figure 6:
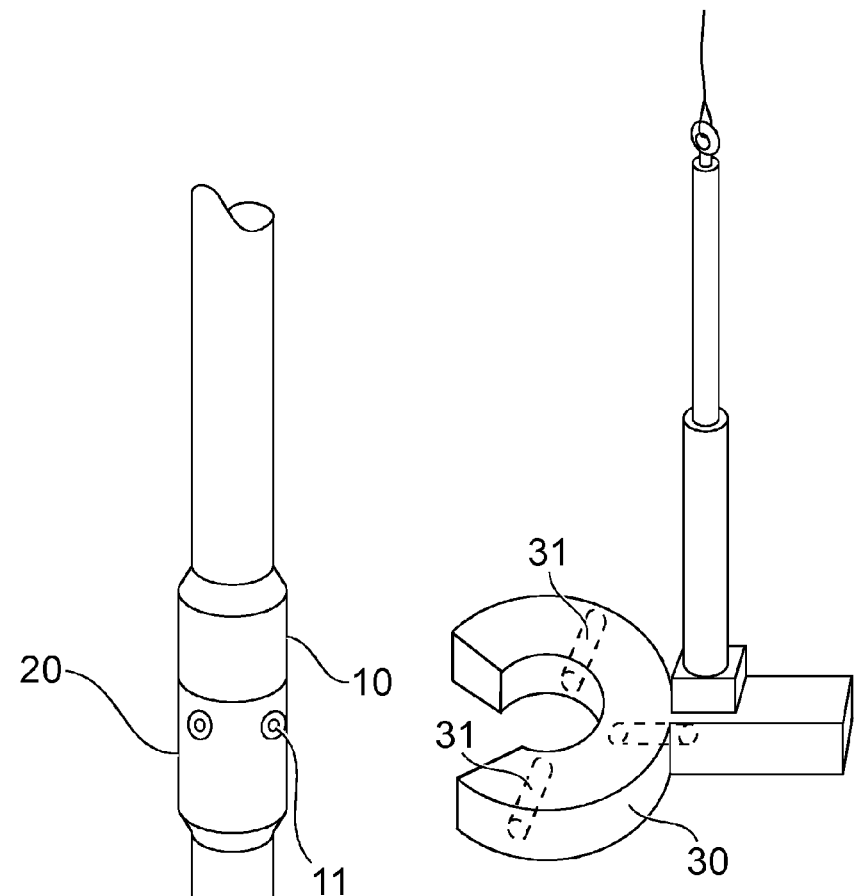
FIG. 6 shows a makeup/breakout tool used with example connections according to the invention.
Figure 5:
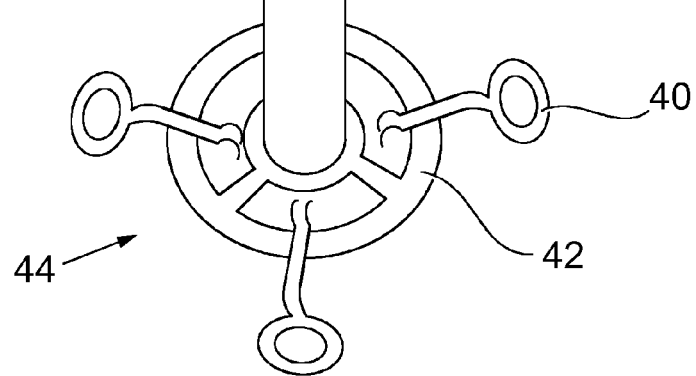
FIG. 5 shows a connection being assembled or disassembled on a drill rig floor.

FIG. 5 shows an example threadless connection either being assembled or disassembled on a rig floor. The pin end 10 is shown above the box end 20. The lower of the two illustrated pipe joints, including the box end 20 protruding from the rig floor 44 is seated in pipe slips 40 including locking dies 42 to hold the entire drill string longitudinally as the connection is assembled or disassembled. A tool to assemble and disassemble the threadless connections ("makeup tool") is shown in adjacent FIG. 6. A makeup tool 30 may partially surround the threadless connection and extend actuated pins 31, e.g., hydraulically actuated pins, into corresponding openings (11 in FIG. 5) in the box end 20. The pins 31 compress the locking ring (16 in FIG. 1) laterally or radially inwards toward the central longitudinal axis of the pipe joints so as to cause it to disengage from the groove (19 in FIG. 1) in the box end 20. Thus, the pin end 10 may be removed from the box end 12 and the connection may be disassembled. If desired, the interior surface of the box end above the groove (19 in FIG. 1) may be suitably tapered (shown in FIG. 1 as tapered surface 13) so as to cause compression of the locking ring (16 in FIG. 1) as the pin end 10 is inserted into the box end 20. Such taper 13 would enable assembly of the connections without the use of a special tool such as the one shown in FIG. 6, but would enable connection merely by inserting the pin end 10 into the box end 20 and applying some amount of axial force to cause the locking ring to compress until it reaches the groove (19 in FIG. 1).

Figure 7:
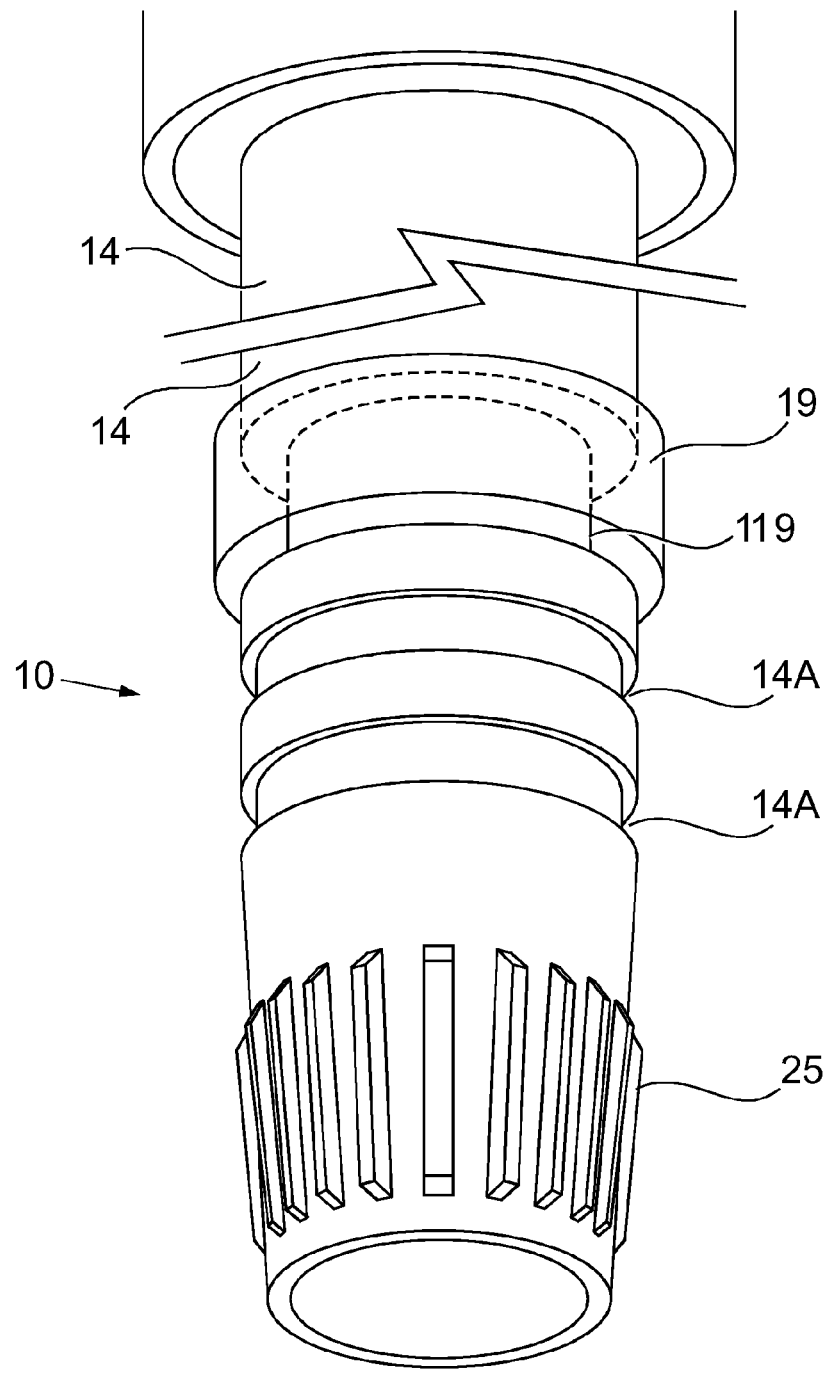
FIG. 7 shows a pin end in detail.

FIG. 7 shows a pin end 10 in detail, in particular showing seal grooves 14A, and groove(s) 119 for snap rings(s) 19. Splines 25 transfer torque to the box end connected adjacently are also shown.

Figure 8:
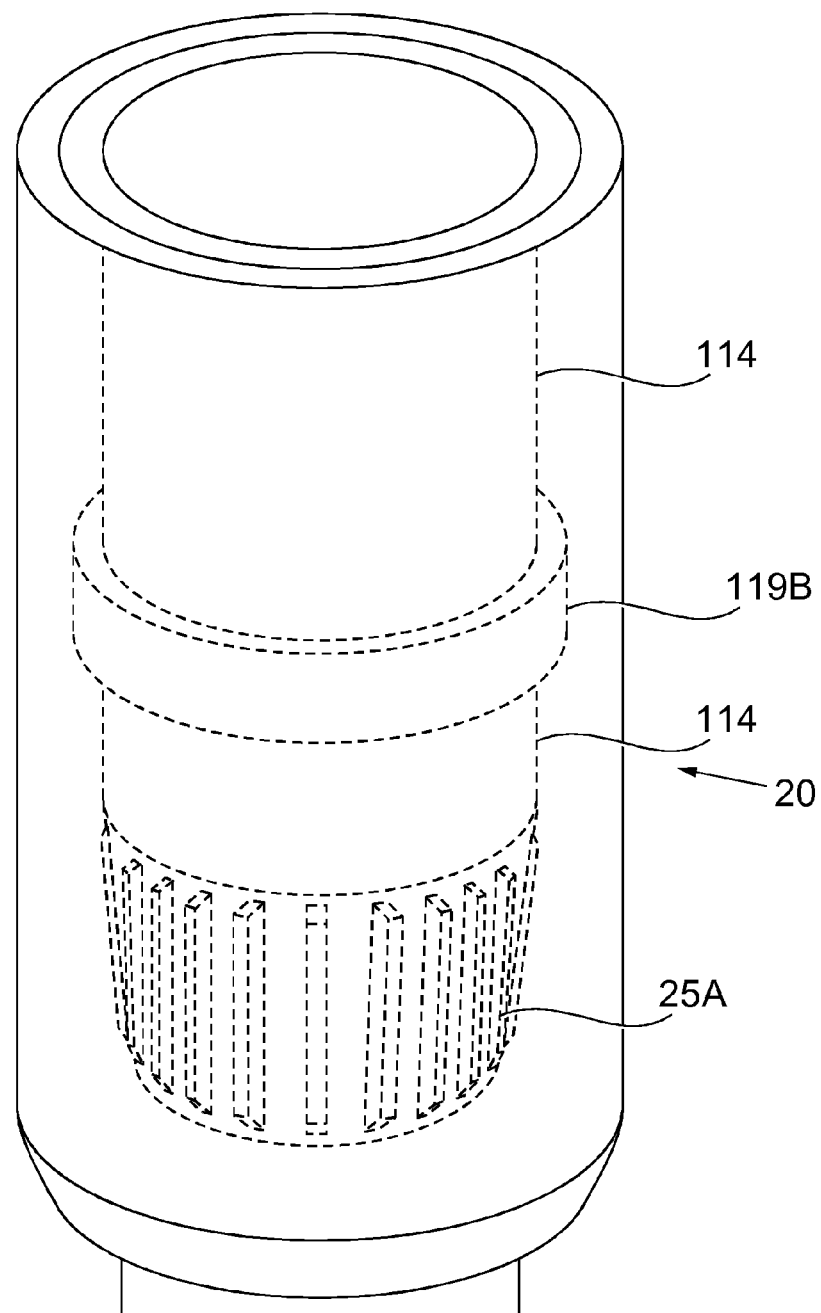
FIG. 8 shows a box end in detail.

FIG. 8 shows a box end 20 in detail, in particular showing sealing surfaces 114 against which the 'O' rings 14 will seal and groove(s) 119B for snap rings(s) 19 (not shown in FIG. 8). The splines 25A to transfer torque to the pin end connected adjacently are also shown.

Figures 9, 10, 11:
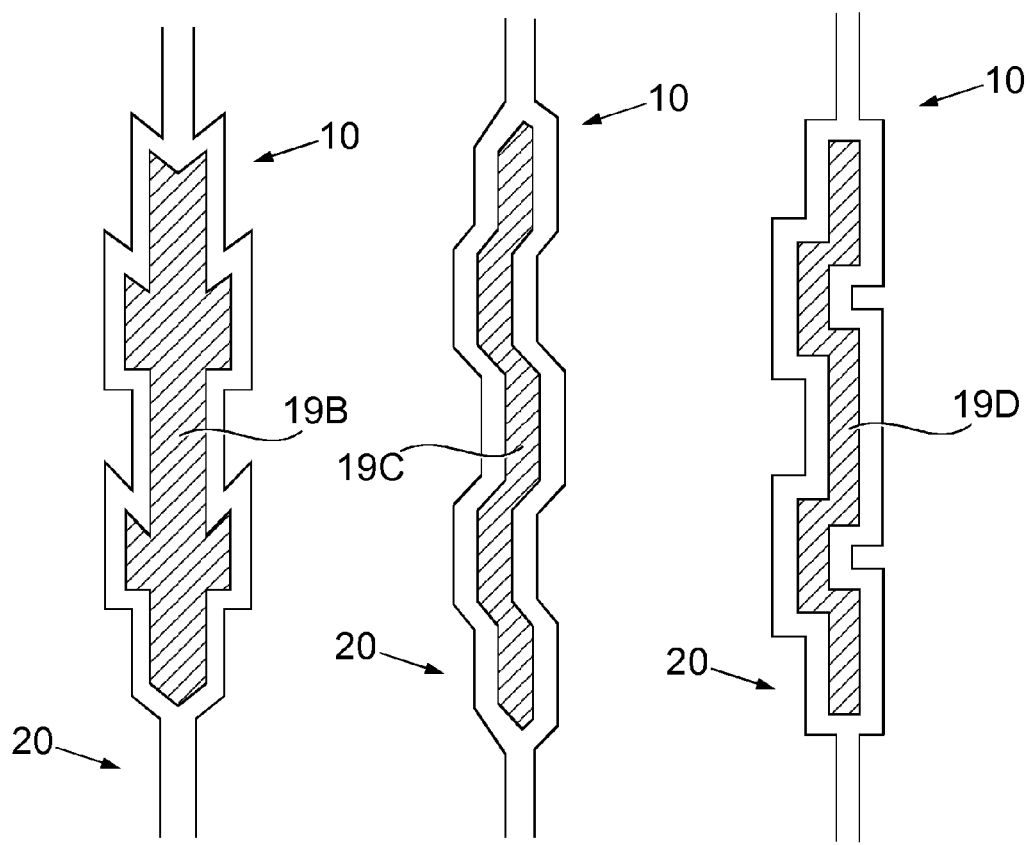
FIGS. 9, 10 and 11 show various examples of snap rings to hold connections together.

FIGS. 9, 10 and 11 show various examples of snap rings, 19B, 19C, 19D, respectively to hold connections together. As previously explained, the locking or snap rings may be compressed or collapsed or moved radially inwardly towards the central longitudinal axis of the pipe joints by external compressive (mechanical) force, electrical force if the rings are made of, for example piezoelectric material, or magnetically for rings made of magnetic material.

Figure 12:
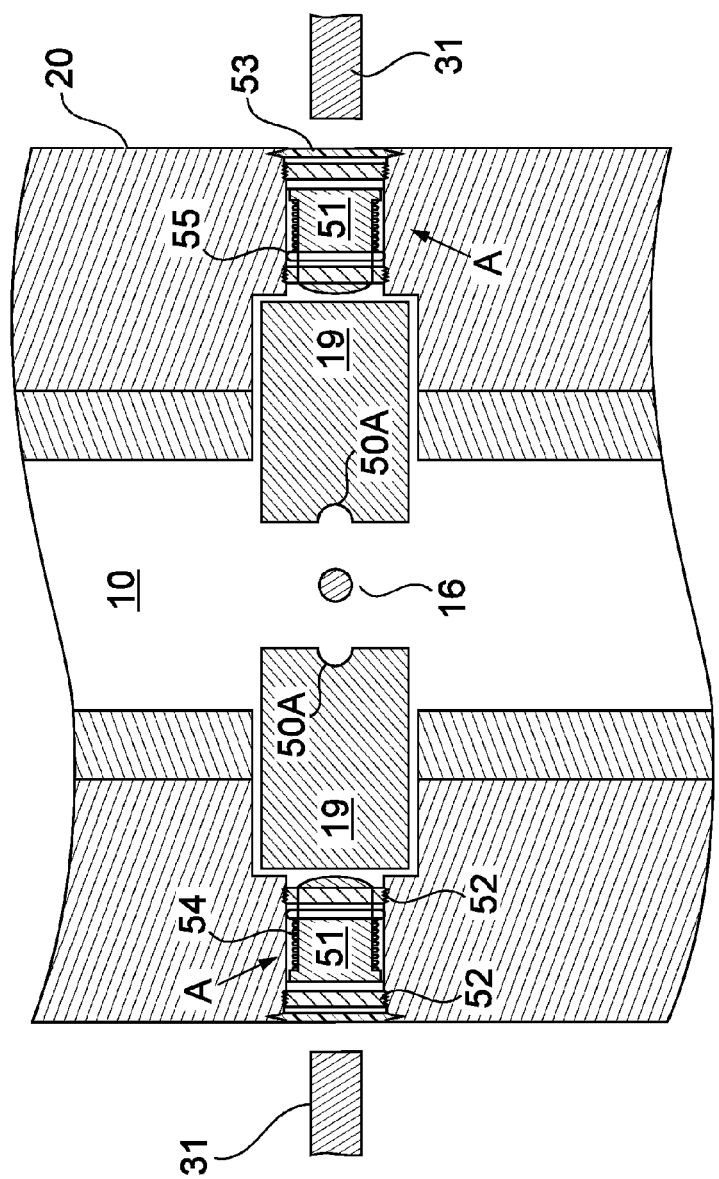
FIG. 12 shows another example of a snap ring to hold connections together.

Another example connection is shown in cross sectional view in FIG. 12. The wall of the box end 20 includes openings A positioned longitudinally at the same position as the locking ring(s) 19. The openings A may be sealed prior to or during assembly of the connection by inserting therein a plug 51. The plug 51 may include o-rings 52 or similar seals to exclude fluid from the openings A. The plug 51 is shaped so that biasing force may be exerted against a nut plate 55 or similar device locked in the port A closer to the center of the box end 20. A spring 54 may apply biasing force to cause the plug 51 to be urged away from the nut plate 55, thus reducing the possibility of accidental operation of the locking ring 19. The plug 51 may be covered on its exterior by a seal 53 such as an elastomeric seal to exclude fluid from the wellbore annulus from entering the port A. The actuation devices (tong pins 31) are shown in the approximate position they will be when it is desired to disconnect the box and pin.

Figure 13:
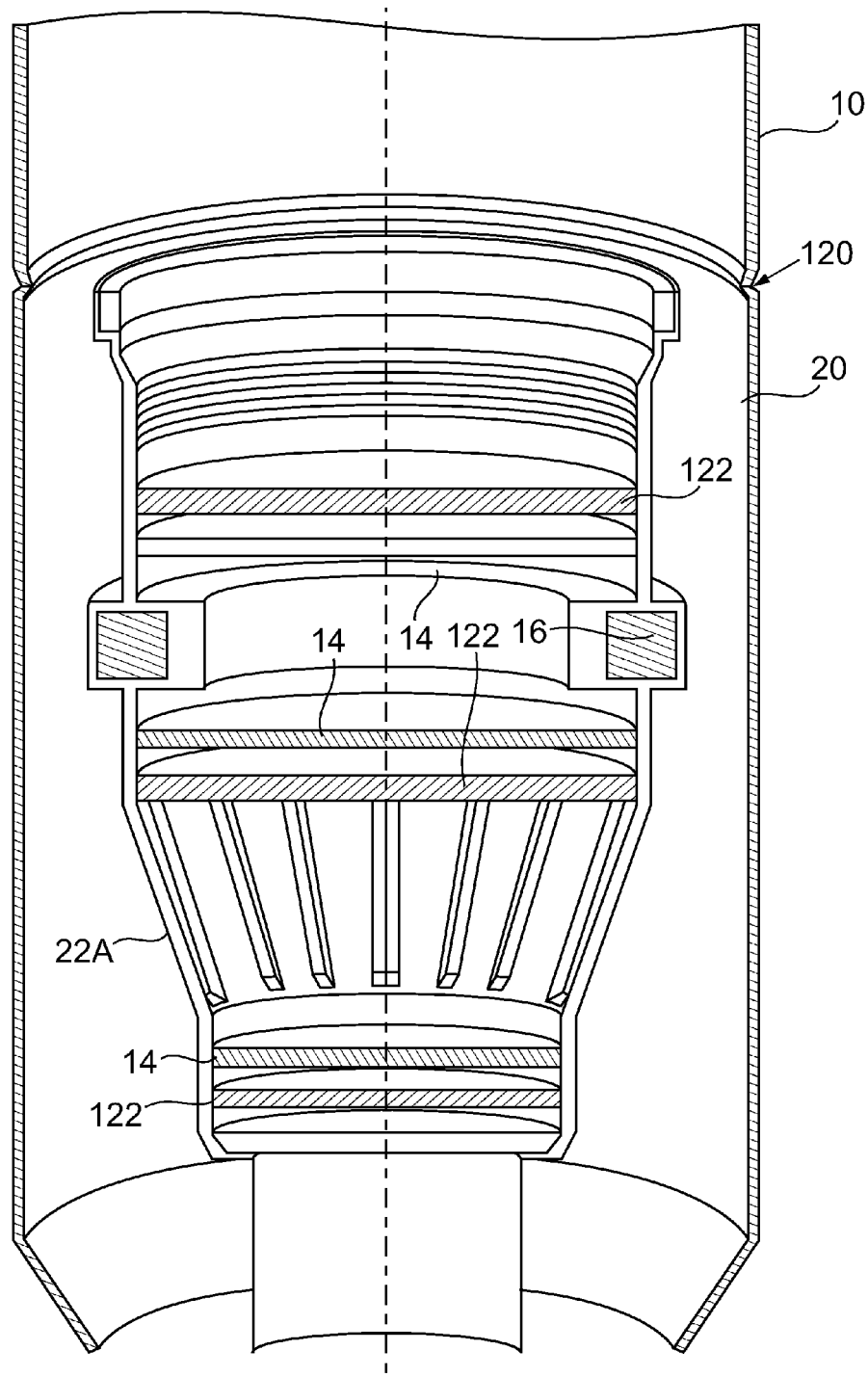
FIG. 13 shows placement of an example metal to metal seal proximate the top of the box end.

FIG. 13 shows the position of the pin 10 inside the box 20. Starting from the bottom end, seals 122 and then the 'o' ring 14 are placed below the splines 22A. The seal 122 and "o" ring 14 prevents drilling mud and other material which is being pumped down the pipe from getting into the splines 22A and upper area of the pin 10 and box 20. The pin 10 and box 20 mesh together at the splines 22A, and shown above that is another area that shows another set of seals 122, 14. Above that, the snap ring 16 assembly is shown, and then another area of seals 122, 14 and possibly chevron seals or another type.

The body of the pin and box may be tapered to allow the stabbing in of the pin into the box. Such configuration would allow a single pipe or stand that is being stabbed into the box room to get in, due to wind or cause of non-alignment. The top section of the box 20 and the pin 10 gets larger to allow the fitting of the metal to metal seal 120 so that the pin squeezes or pushes the metal to metal outward, giving a tight fit to eliminate any possibility of wobbling or making the seals leak.

Figure 14:
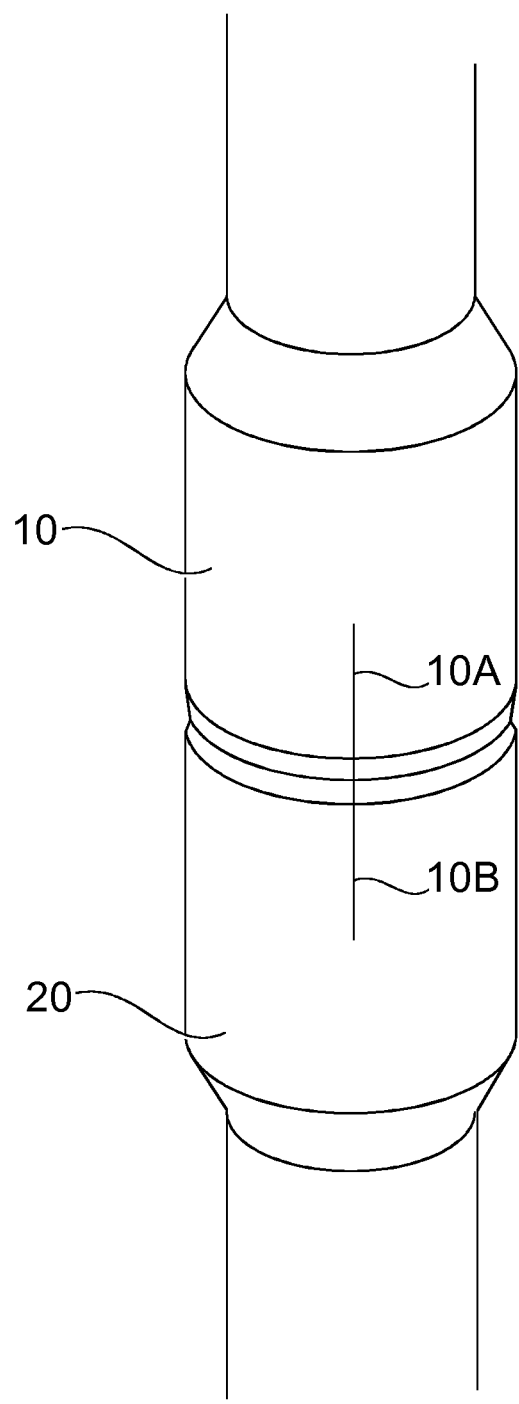
FIG. 14 shows an alignment device for the pin and box on make up/breakout.
Figure 15:
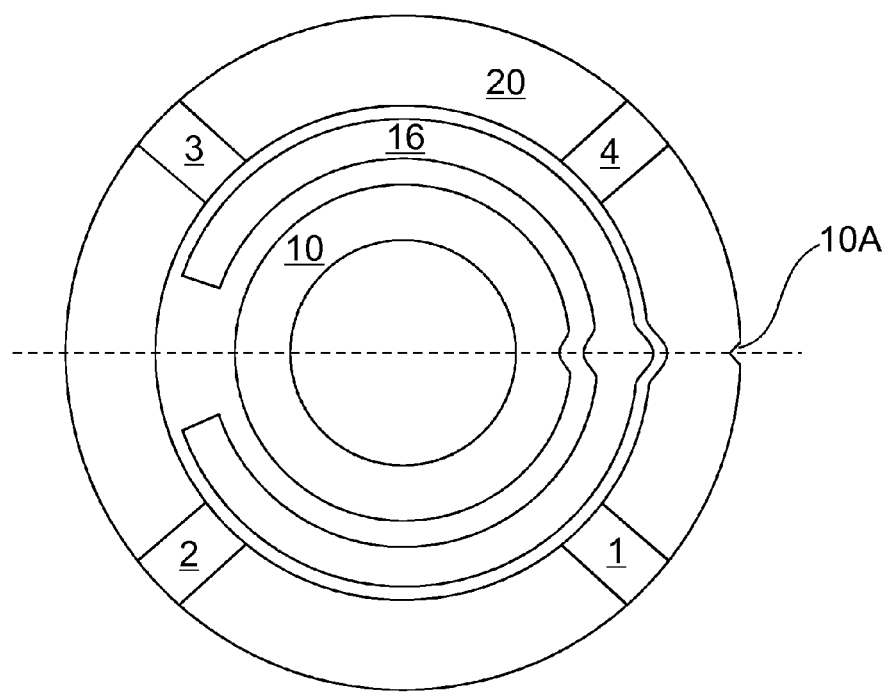
FIG. 15 shows the example alignment device in more detail.
Figure 16:
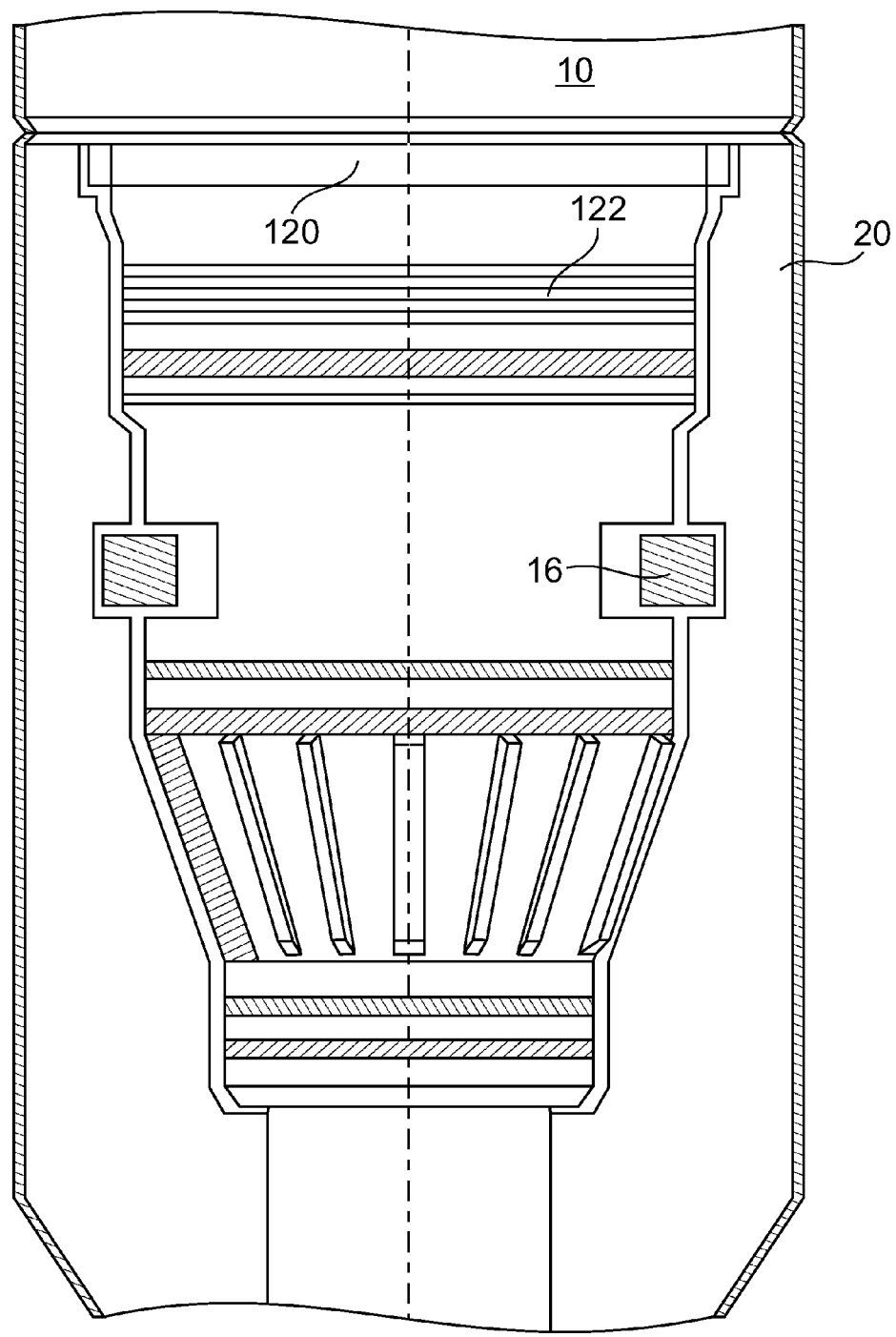
FIG. 16 shows another example of splined pin and box connection.

FIGS. 14, 15 and 16 shows the other concepts. FIG. 14 shows a complete box and pin assembled, with a mark 10 to aid the alignment of the snap ring and disengaging device. FIG. 15 shows how the snap ring would be shaped and the alignment mark such as the one shown in FIG. 15 will work. The area in the circle 10A shows how the box would be cut out and the snap ring formed, to fit into the cutout of the box and pin, and align up with the alignment mark 10 on the outside of the tool joint. The snap ring would have two projections or bumps that line up with the pin and box cut outs. The two or more snap rings disengaging tools are also shown.

In FIG. 16 the entire pin and box are shown. The drawing is very much the same as in FIG. 13, but with two differences: (a) the spline arrangement shows that this section is altered somewhat, so the alignment of the snap rings and the alignment mark on the outside of the tool joint would be correct; and (b) the area above the snap rings 16 would have been bored out larger than FIG. 13, so that it would take the altered pin and box arrangement, being lowered through the upper area of the snap ring area without touching that part with the seals.

FIGS. 17 and 18 show two different views of the box of the tool joint. One view is from the top and one is from the side. In both drawings, it shows the metal to metal seal ring on the top of the box with a shoulder in the box for it. The metal to metal seal ring 120 should be over an inch in height with two seal areas, one on the top and one on the bottom. The seals 120 on the outside should be concave, and on the inside, convex. When the pin 10 is nearly into the box, this will force or squeeze the metal outward, and form a tight seal to prevent wobbling.

Figure 19A:
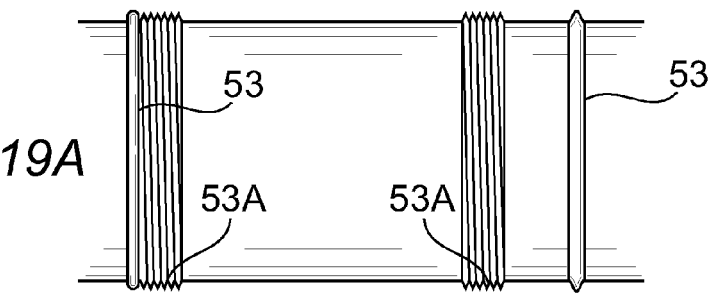
FIGS. 19A through 19D show various examples of a bore seal and pin to actuate the snap ring from outside the box end.
Figure 19B:
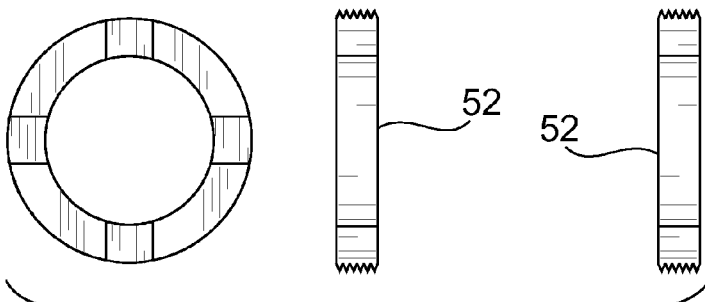
Figure 19C:
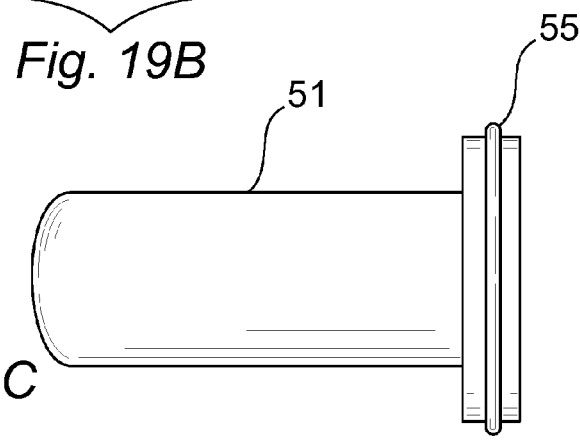
Figure 19D:
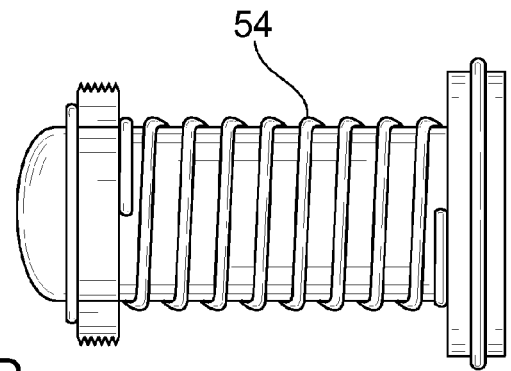

FIGS. 19A through 19D shows the snap ring disengaging in four sections. Each drawing shows the disengaging device in different pieces. In FIG. 19A, the box 20 is shown drilled through from the inside of the box 20 to the outside of the box 20, with threaded sections 53A on both sides, and an elastomeric seal 53 on one side and an "o" ring 55 on the other. FIG. 19B shows two nuts 52 which have holes of different sizes drilled through them and threaded to screw into the bore in the box 20. FIG. 19C shows the plug or pin with an elastomer or other "o" ring 55 installed which fits inside the metal nuts (52 in FIG. 19B). FIG. 19D shows the plug 51 with a spring 54 to hold the plug from entering the snap ring (16 in FIG. 13). As explained with reference to FIG. 6, the power tong pin is put around the tool joint when one is ready to pull the pin 10 from the box 20 to disengage it. The power tong pin (31 in FIG. 12) is activated and forces the pin 51 or plug forward (in the direction radially inwards towards the longitudinal central axis of the pipe joint) until it cannot be closed anymore, thus disengaging the snap ring (16 in FIG. 13). The pin end 10 is picked up and the tool is free from the box end. The "o" rings and elastomer seals prevent mud from getting into the mechanism and sticking it up.

Figure 20:
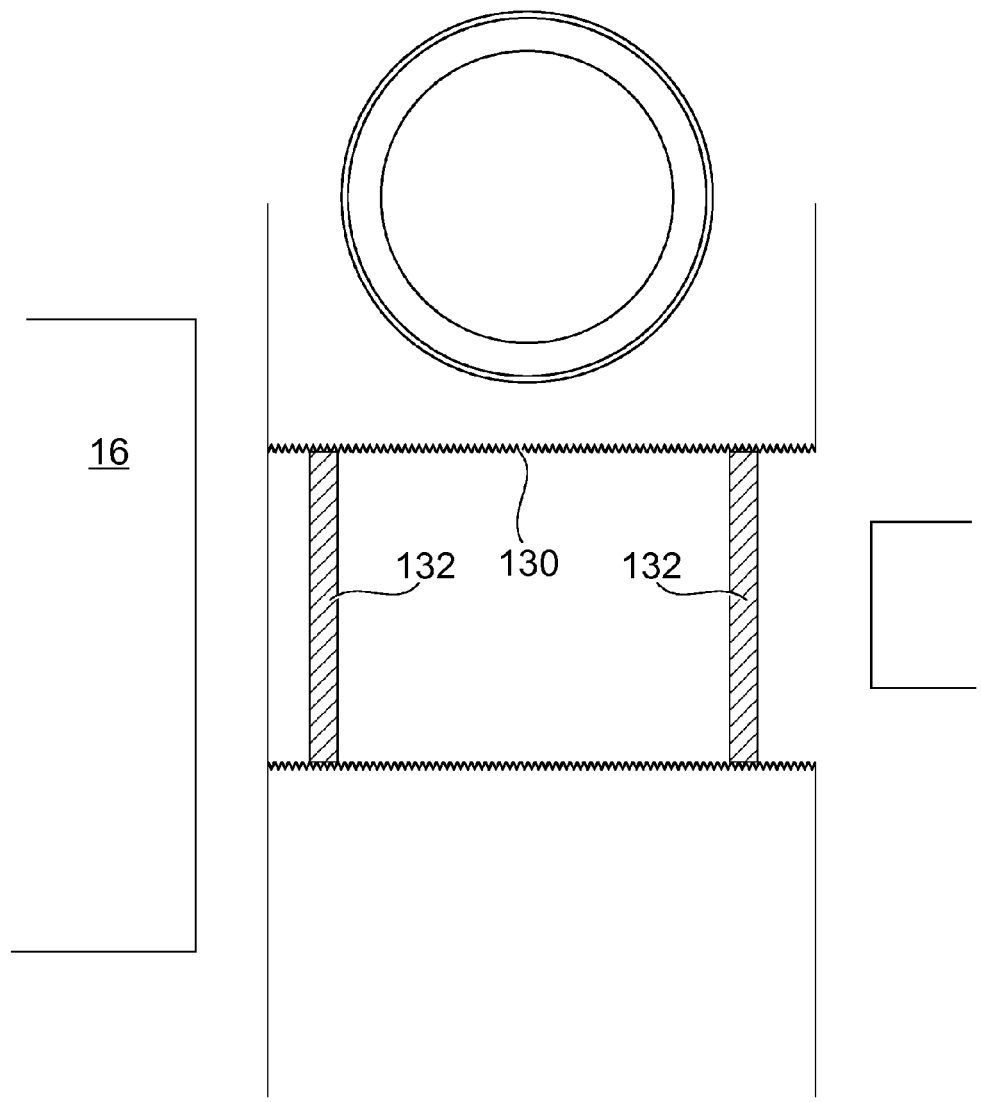
FIG. 20 shows another example of bore seal and pin to actuate the snap ring.

FIG. 20 shows a box end 20 drilled out for a disengaging device 130 that is larger than the one above in FIGS. 19A through 19D. It is threaded along its entire length and has two seals 132 to prevent plugging up with mud when screwed in tightly. The disengaging device 130 is a complete unit that can be changed out on the rig if necessary.

A threadless drill string connection such as shown in the accompanying figures and as explained herein may facilitate assembly and disassembly of a drill string or other pipe string, and may enable rotation of such pipe string in either direction without the risk of uncoupling one or more joint connections.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threadless connection for coupling segments of drill pipe longitudinally end to end, comprising:
   a pin end on each drill pipe segment having a groove for receiving therein a locking ring;
   a box end on each drill pipe segment having a groove for receiving the locking ring therein when the pin end is inserted into the box end;
   a compressible locking ring having an uncompressed diameter selected to at least partially engage the groove in the pin end and the box end when the pin end is inserted into the box end, the locking ring configured to enable sufficient change in diameter to disengage from the groove in either the pin end or the box end, the locking ring comprising at least one of a piezoelectric and a magnetic material; and
   a metal seal ring disposed in the box end prior to insertion of the pin end therein, the metal seal ring expandable by insertion of the pin end to substantially eliminate wobble;
   wherein the metal seal ring is concave on a radially outside edge thereof;
   wherein the metal seal ring is convex on a radially inside edge thereof;
   wherein the metal seal ring comprises an essentially planar sealing surface on each of a top end and a bottom end thereof, said planar sealing surfaces extending from said inside edge to said outside edge;
   wherein the metal seal ring is disposed in a shoulder formed in the terminal end of the box end;
   further comprising corresponding torque transmitting features on both the pin end and the box end to enable transmission of torque through the connection in either rotational direction; and
   wherein the torque transmitting features extend longitudinally along the respective pin and box ends, in a direction parallel to at least a portion of the central axis of the pin and box ends.

2. The connection of claim 1 further comprising at least one sealing element disposed in at least one of the pin end and the box end to create a pressure tight seal when the pin end is engaged to the box end.

3. The connection of claim 1 further comprising mating shoulders on each of the pin end and the box end to transmit axial loading between respective pipe segments when the pipe segments are placed in compression.

4. The connection of claim 1 wherein the box end includes a tapered interior surface above the groove therein such that insertion of the pin end results in compression of the locking ring to enable engagement with the groove in the box end solely from insertion of the pin end into the box end when the locking ring is located in the groove in the pin end prior to insertion thereof into the box end.

5. The connection of claim 1 wherein the pin end and the box end are disposed on opposite longitudinal ends of each of a plurality of segments of a drill pipe.

6. The connection of claim 1, wherein there are a plurality of corresponding torque transmitting features on the pin end and a corresponding same number of torque transmitting features on the box end.

7. The connection of claim 1, wherein the respective torque transmitting features on the pin and box end comprise a matching number of splines.

8. The connection of claim 1 further comprising access ports in the box end to enable insertion therein of corresponding pins to disengage the locking ring from the groove in the box end, thereby enabling disassembly of the pin end from the box end.

9. The connection of claim 8 wherein the access ports are at a same longitudinal position as the locking ring.

10. The connection of claim 9 further comprising a plug insertable in each of the access ports.

11. The connection of claim 10 wherein each plug is sealingly engaged with a corresponding port when inserted therein.

12. The connection of claim 11 wherein each plug is sealed on its exterior by an elastomeric seal when inserted into a corresponding port.

\* \* \* \* \*